United States Patent [19]

Suwannukul

[11] Patent Number: 4,924,413
[45] Date of Patent: May 8, 1990

[54] COLOR CONVERSION APPARATUS AND METHOD

[75] Inventor: Sakarin Suwannukul, Oakland, Calif.

[73] Assignee: Hercules Computer Technology, Berkeley, Calif.

[21] Appl. No.: 55,789

[22] Filed: May 29, 1987

[51] Int. Cl.$^5$ .............................................. G06F 5/06
[52] U.S. Cl. .................................... 364/521; 340/701
[58] Field of Search ................. 364/521; 340/701, 703

[56] References Cited

U.S. PATENT DOCUMENTS 4,408,200 10/1983 Bradley .......................... 340/703 X Primary Examiner—Gary V. Harkcom
Assistant Examiner—Mark K. Zimmerman
Attorney, Agent, or Firm—Limbach, Limbach & Sutton

[57] ABSTRACT

An apparatus and method in which a color graphics display system can run software written for either a color graphics system or a monochrome system, and in which a monochrome graphics system can run software written for either a monochrome system or a color graphics system, in which color image data is separated into monochrome image data and color control information so that a central processing unit can operate upon the image data as if running a monochrome program, yet continue to provide a color visual display by use of color control information which designates the colors to be displayed as part of a control operation.

7 Claims, 3 Drawing Sheets

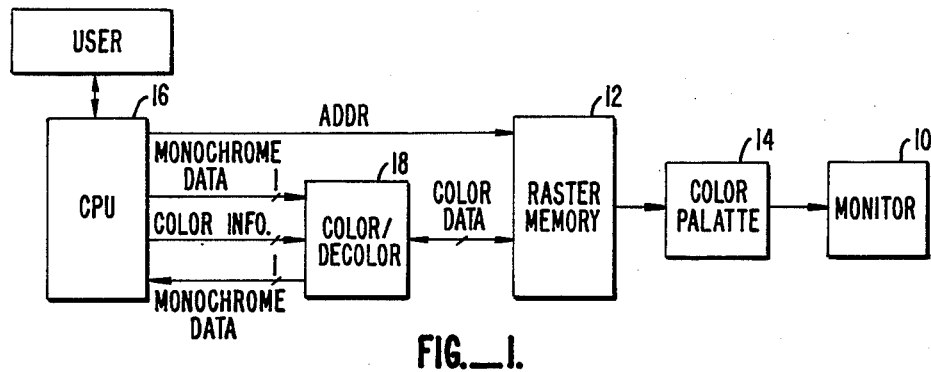
FIG._1.
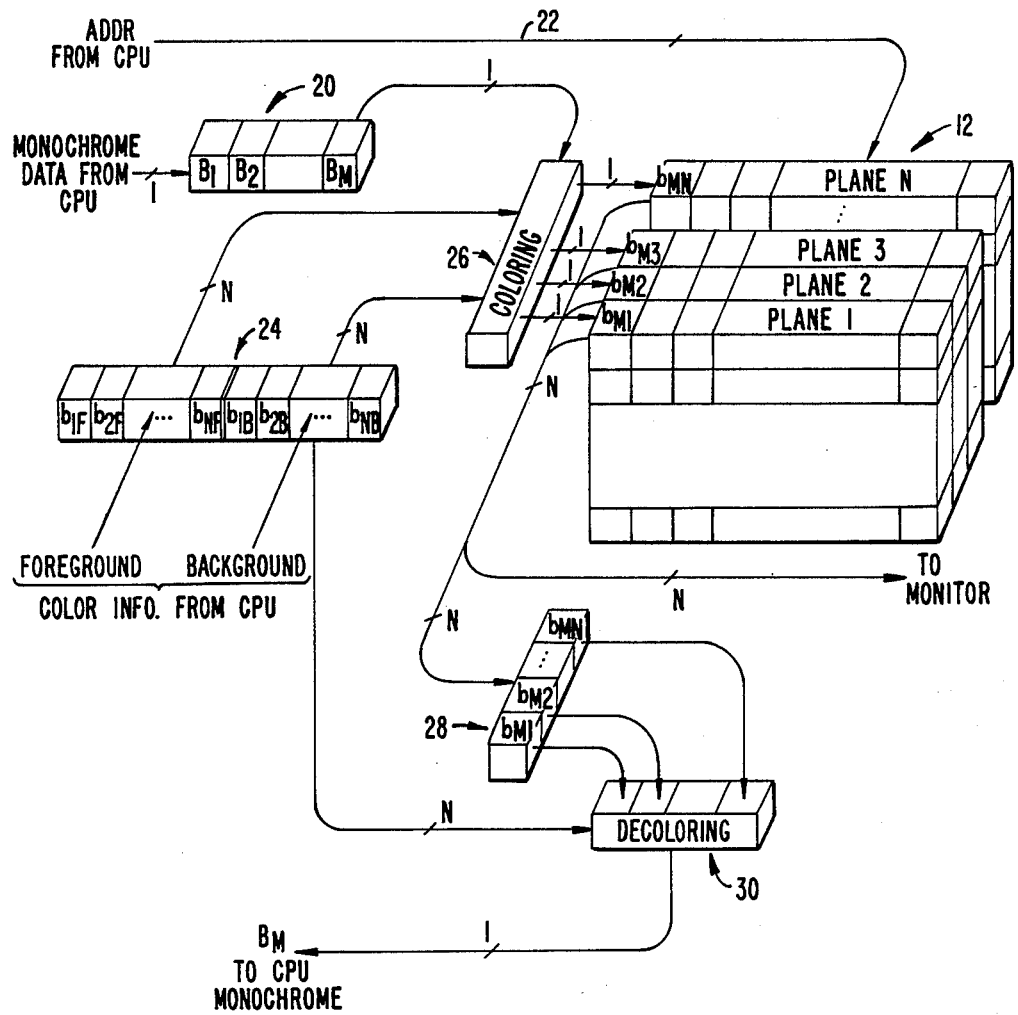
FIG._2.

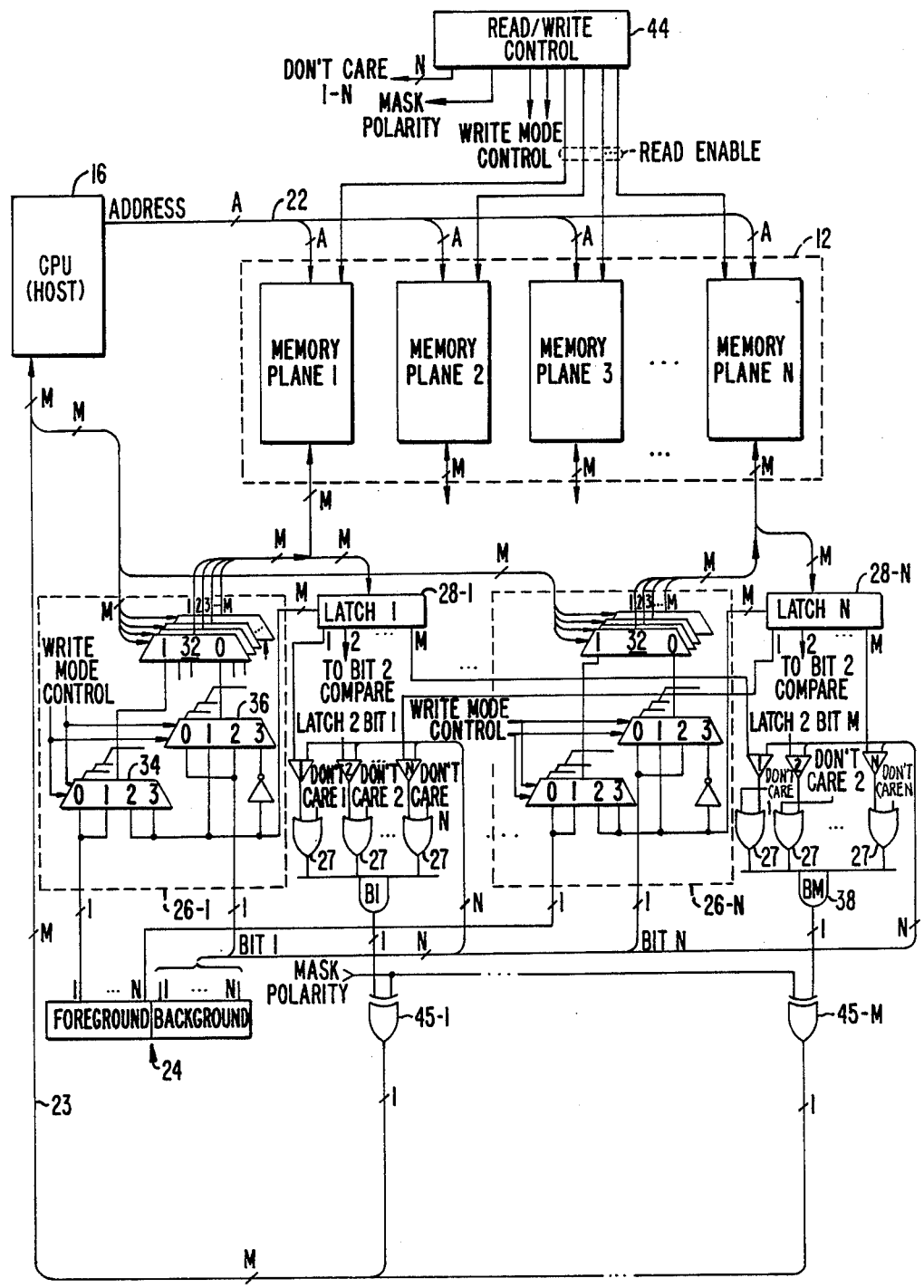
FIG._3.

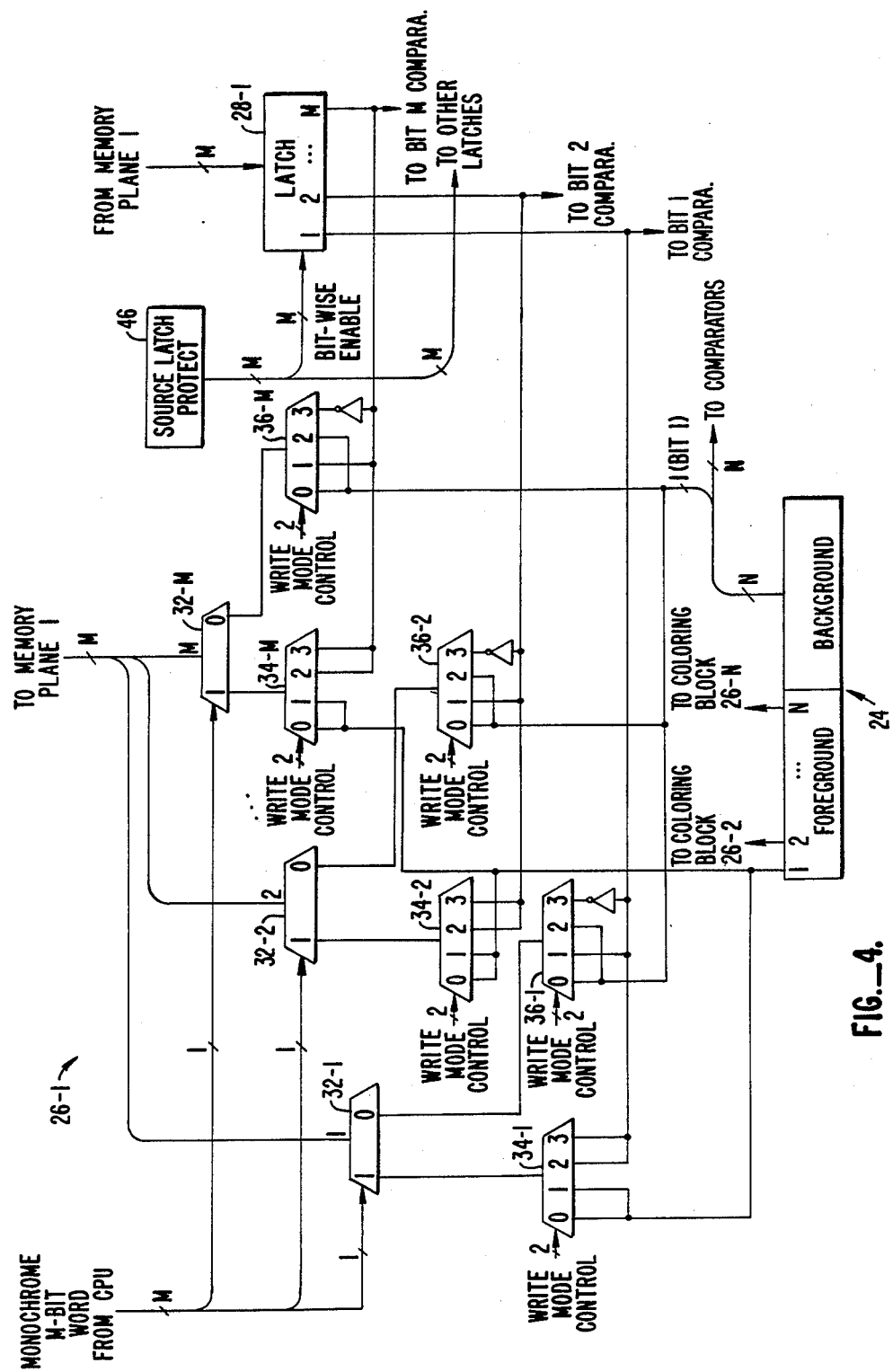
FIG._4.

COLOR CONVERSION APPARATUS AND METHOD

Technical Field

The present invention is directed generally to a method and apparatus for displaying information on a visual display monitor, and more specifically to a method and apparatus which is compatible with software written for either monochrome or color display systems by separating-out the image manipulation activities from color designation activities.

BACKGROUND ART

In the early days of microprocessor based computers, most visual display systems provided a monochrome display. That is, a pixel on a visual display screen could be represented by a single bit stored in a raster memory. As such, display routines for such systems offered image manipulation at the bit level. That is, because data stored in raster memory was either a 1 or a 0 at each pixel position, writing or reading from raster memory, and manipulation of the data from raster memory, was a simple process.

In such image manipulation routines, new information could be written into memory in direct as well as more sophisticated ways. For example, the data in memory simply could be written over by new data. Alternatively, the existing data in memory could be read-out, then logically combined with the new data to be written-in, with the result of the logical operation being the actual data written into memory. Typically, the logical operations were the basic AND, NOT, XOR, or OR boolean logic operations.

An OR logical operator could be used to place an object onto a background of unknown value. An AND logical operation could be used to place a bit pattern onto a reverse-video field. An XOR logical operation could be used to place and erase a dot or a mask. A NOT could be used to compliment the value of the data.

More recently, as microcomputer display systems have become more sophisticated, color monitors have come into more widespread use. Unfortunately, the displaying of color information on a monitor requires significantly more information per pixel than is required for monochrome displays. While a monochrome display could be satisfactorily provided with a single bit per pixel, color displays typically require four or more bits per pixel. Not only is the raster memory required to increase in size, but the traditional manipulation of data from the raster memory by way of logical operations in the control processing unit become much more difficult. For example, the ANDing of a word of data designing the color of a pixel against a reference color would require a multiplicity of AND operations, as opposed to a single AND operation in the monochrome case.

When such increased logical operation requirement was performed in the central processing unit ("CPU"), this greatly slowed the execution time of the central processing unit. Traditionally, in order to solve such a problem, hardware which performed the logical operations was provided so that the CPU was freed of heavy computational loads. The problem with such an arrangement is that software written for monochrome display systems would not operate properly with such color systems. This is because the software written for monochrome systems assumed that logical operations were available within the CPU. No provision for requesting hardware logical operations would be provided in such software.

This resulted in an incompatibility of software written for monochrome systems when the user attempted operation of such software on color systems. Likewise, software written for color systems could not be used on monochrome systems.

It is therefore clear that it is highly desirable to provide a color display system which is compatible with monochrome software, and conversely to provide a color system in which software written for such color system could also be run on a monochrome system.

SUMMARY OF THE INVENTION

These and other problems and disadvantages of previous color display systems are overcome by the present invention of a color display system in which image information is separated from color information such that a central processing unit in the system can operate upon the image data as if it were monochrome in nature, and such that the CPU can provide color control information to a conversion board which conversion board receives monochrome information from the CPU, converts such monochrome information into color data for storage in the raster memory, and further which conversion means receives color data from the raster memory and converts that color data into monochrome data for supply to the CPU. In such a manner, the CPU can perform logical operations upon monochrome type data, but have the results of such operations translated into a color, and then stored in color format in the raster RAM.

In the preferred embodiment to the present invention, coloring means and decoloring means are provided. The central processing unit provides image information, in monochrome bit form, and separate color control information. The coloring means are responsive to the color control information and to the monochrome bit-data so as to place into raster memory the appropriate color information depending upon the logic state of the monochrome bit data. In further embodiments of the present invention, the color control information can also originate from the color data that was previously stored in the pixel location to which the new color information is to be written.

The decoloring means are responsive to the color control information from the CPU, and also to color data provided from raster memory, which color data is stored corresponding to the pixel being addressed in raster memory by the central processing unit. No processing of address information from the central processing unit is required. In accordance with the present invention the CPU can directly address the raster memory. The decoloring means provide a comparison function to determine whether the color data from the raster memory matches the color control information received from the central processing unit. Information about the matching or non-matching of the information is supplied to the CPU in monochrome bit form. That is, when one seeks to determine whether the color information stored in raster memory at a particular pixel location is a background color or a foreground color, the decoloring means will return a bit of information indicating by a first logic state that the stored color information corresponds to background color and by a different logic state that the stored color information corresponds to foreground information.

In this manner, the CPU is permitted to perform all logical operations in a monochrome bit context, yet the information that is stored in the raster memory is in the form of color data. Further, information read from raster memory and provided to the central processing unit is in monochrome bit form, even though the actual information stored in raster memory is in color data form.

It is therefore an object of the present invention to provide a method and apparatus for displaying of color information which is compatible with software programs written for either monochrome or color applications.

It is another object of the present invention to provide a method and apparatus by which the central processing unit in a display apparatus is permitted to perform logical operations upon the image data and separate means are provided to color or decolor the information stored in raster memory.

It is a further object of the present invention to provide a display method and apparatus in which image manipulation operations are performed separately from coloring or decoloring operations.

These and other objectives, features and advantages of the present invention will be more readily understood upon considering the following detailed description of the preferred embodiments of the present invention and the accompanying drawings.

BRIEF DESCRIPTION OF THE DRAWINGS

FIG. 1 is a simplified depiction of the present invention.

FIG. 2 is a conceptual diagram illustrating the coloring and decoloring functions of the present invention.

FIG. 3 is a more detailed functional block diagram illustrating the operation of the coloring and decoloring operations of the present invention.

FIG. 4 provides a more detailed functional block diagram illustrating the relationship of the contents of the latch and selection multiplexers for the M-bit monochrome word embodiment of the present invention.

DETAILED DESCRIPTION OF THE PREFERRED EMBODIMENT

Referring to FIG. 1, the present invention is illustrated in the context of a visual display apparatus. In such a system, visual images are displayed on a monitor 10 which can be a monochrome or color monitor. The information displayed on monitor 10 can originate from the raster memory 12 which provides information to the monitor by way of a color palette 14, when the system is a color display system.

In the monochrome context, color palette 14 would not be used.

The information stored in raster memory 12 has a one-for-one relationship to the visual image displayed on monitor 10. That is, for each address supplied to raster memory 12, by central processing unit 16, the information stored at that address is used to generate a pixel that is displayed on monitor 10. In the context of a monochrome system, the information could be a single bit which is displayed by monitor 10 as either a dot, or no dot, depending upon the logical state of the bit. In the color monitor context, the information can be a word which is several bits in length. The word is used to address color palette 14, which supplies information to the monitor so that the appropriate combination of the basic colors are generated by the monitor and converged at the corresponding pixel location on monitor 10 so as to provide the desired color.

As discussed above in the background art section, previous monochrome systems performed all logical operations upon the display data within the central processing unit. As such, prior systems could be represented by the block diagram in FIG. 1 by eliminating the color/decolor block 18 and drawing a data bus directly between central processing unit 16 and raster memory 12.

As also discussed above, the move to color display systems greatly increased the computational load required of a central processing unit such that processing speeds of color display systems which continued to provide logical manipulation within the central processing unit were greatly slowed.

In the present invention, image manipulation continues to be performed by the central processing unit 16. However, the designation and determination of color information are performed by color/decolor block 18. More specifically, the central processing unit 16 provides and receives monochrome data to and from color/decolor block 18, respectively.

Central processing unit 16 also provides color control information to color/decolor block 18. In turn, color/decolor block 18 provides and receives color data to raster memory 12. Central processing unit 16 continues to address raster memory 12 directly.

In the central processing unit 16, the coloring information that is provided to color/decolor block 18 originates from the applications program which is working with the image stored in raster memory 12. That is, when the color of an image is to be changed or written, the applications program provides color information by way of instructions to store particular color values in the color/decolor block 18. In other words, color information is designated by the applications program separately from any logical information which is to be performed by the central processing unit 16 upon the image data.

As used in the present invention, the image to be displayed is defined by two parameters: 1) image data, and 2) color information. More specifically, the image data is in the form of a single bit per pixel. The color information is in the form of multiple-bit words which designate colors for background and foreground, or object and mask.

Referring to FIG. 2, the conceptual operation of the present invention will be explained in greater detail. FIG. 2 illustrates in simplified form the flow of image data, color data and color information between the CPU 16 and the raster memory 12. It is to be understood that FIG. 2 illustrates the present invention in the context of handling a single pixel at a time so as to keep the explanation simple. It is also to be understood that the present invention is preferably employed to handle a plurality of pixels at a time. This latter embodiment is discussed herein in connection with FIG. 3.

For purposes of explanation FIG. 2 shows a stream of image bits, $B_1, B_2, \ldots B_M$ from the CPU 16. This stream is represented by block 20. Address information is supplied directly to raster memory 12 via address bus 22 from CPU 12. Raster memory 12 is shown to be made up of N planes of memory, all of which are simultaneously addressed by CPU 12 via address bus 22. As such, a word of color data N-bits long can be stored in raster memory to define the color for each pixel. For a particular pixel represented by color data stored at a particular address, each plane of the raster memory 12 will store a bit of the color data at the particular address. Thus, when the raster memory 12 is addressed, each plane will provide a bit of data, the collection of which provides the N-bit color data word.

Color information is provided by CPU 12 separate and apart from the image bits. This color information includes foreground color information and background color information which are stored in registers represented by block 24. As can be seen from FIG. 2 the foreground information can be a word having a length corresponding to the number of planes of the raster memory 12. In the example of FIG. 2, the word of foreground color information can be N-bits in length: $b_{1F}, b_{2F}, \ldots, b_{NF}$. Likewise, in the example of FIG. 2, the word of background color information can be N-bits in length: $b_{1B}, b_{2B}, \ldots, b_{NB}$.

The foreground color word and the background color word are supplied to a coloring block 26. In turn, coloring block 26 is controlled by the logic state of the image bits from block 20 to provide as an output either the foreground color word or the background color word. Thus the output of coloring block 26 is an N-bit word. Each bit of the N-bit word from coloring block 26 is written into a different one of the N planes of raster memory 12 and at the address provided by the CPU 16 on address bus 22. In the above manner, image data and addressing from the CPU 16 can be in a monochrome format, yet the data written into raster memory is in full color.

As discussed above, the present invention permits the CPU 16 to manipulate data in the raster memory 12 as if the data were monochrome in nature. In fact, the present invention provides monochrome type data to the CPU 16, even though the data in raster memory is in color. In order to do so, a latch functional block 28 and decoloring functional block 30 are provided. Latch functional block 28 temporarily stores the N-bit word of data which designates the color for the pixel being addressed at the time. This N-bit word of data is then compared by the decoloring functional block 30 with the background color word stored in register 24, on a bit-by-bit basis. If the words match, decoloring functional block 30 supplies a logic state, such as a logic one, to the CPU 12. If there is no match, decoloring functional block 30 supplies a different logic state, such as a logic zero, to the CPU 12. In this manner CPU 12 supplies image data to and receives image data from raster memory 12 in monochrome form, yet the data which is stored in raster memory 12 is in color form.

As discussed earlier, in order to simplify the description of the present invention, FIG. 2 shows bit $B_M$ of an M-bit word being processed by coloring block 26. In practice coloring block 26 can handle all M bits at the same time. Further, for simplification purposes, FIG. 2 shows decoloring functional block 30 and latch functional block 28 handling a single color word at a time. In practice in accordance with the preferred embodiment of the present invention, when CPU 16 addresses raster memory 12, and assuming the CPU is operating in M-bit words of monochrome data, M color words, each N-bits long, are read out of raster memory 12 per address, and supplied to latch functional block 28 for processing by decoloring functional block 30.

It is further to be understood that the foreground and background colors used in register 24 need not originate from CPU 16. For example, the color stored at another or the currently addressed pixel location in raster memory 12 can be designated as the foreground or background color. Further, the inverse of such colors can also be designated. Moreover, the decoloring functional block 30 can be configured so that the monochrome data returned to the CPU 16 in a read operation can indicate whether the addressed pixel is in a color which corresponds to a background color or to other than a background color. The implementation of these and other variations is shown in greater detail in FIG. 3.

Referring to FIG. 3, elements common to FIG. 2 are labelled with the same reference designation. Raster memory 12 is shown to have N planes of memory, each addressed in parallel by CPU 16, and each providing or receiving an M-bit word. For a particular plane of the raster memory 12, each bit of the M-bit word corresponds to a different pixel. For example, bit 1 of the M-bit word read out of each of the N planes of memory from a particular address will collectively form the word which indicates the color for the particular pixel. Likewise, in a write operation, each of the N planes of memory of the raster memory 12 receives an M-bit word. Corresponding bits from each of these M-bit words collectively form the word which indicates the color for the particular pixel.

With respect to a write operation in FIG. 3 assume that the CPU 16 provides an M-bit monochrome word which represent M pixels of the image to be displayed. The M-bit word supplied to plane 1 of raster memory 12 is generated as follows. All of the M bits of the monochrome word are supplied to each of the N coloring blocks 26 associated with each of the N planes of raster memory 12. In FIG. 3, the coloring block associated with plane 1 is labelled with the designation 26-1 while the coloring block associated with plane N is labelled with the designation 26-N, for example. Within a particular coloring block, for example 26-1, each bit of the monochrome word controls the output of a background/foreground multiplexer 32. There are M of these foreground/background multiplexers 32 in each coloring block 26. A foreground select multiplexer 34, and a background select multiplexer 36 provide selectable input values to each of the background/foreground multiplexers 32. In turn, each of the outputs of the M foreground/background multiplexers 32 in a coloring block provide a bit of data which collectively forms an M-bit word for storage in the associated plane of raster memory 12.

FIG. 3 shows foreground select multiplexer 34 and background select register 36 each receiving four inputs, which inputs are selectable in accordance with a two bit write mode control code. It is to be understood that any number of different inputs can be provided to each of the multiplexers in accordance with the present invention, and that the number of bits provided in the write mode control code should be selected to permit each possible input to be selected for output by the multiplexer.

In one embodiment of the present invention, a four plane raster memory, and an eight bit monochrome word format are used. Further, the coloring block 26 provides four foreground/background multiplexers 32, each receiving inputs from corresponding four-to-one multiplexers. As such a two-bit write control code controls the selection by the four-to-one multiplexers.

Note that for an embodiment which provides four planes of raster memory, four foreground/background multiplexers should be used. This is shown by the consecutively positioned multiplexer symbols 32 in FIG. 3. In turn each foreground/background multiplexer 32 is fed by a different pair of four-to-one multiplexers. This is shown more clearly in FIG. 4. FIG. 4 is a more detailed block diagram of coloring block 28-1 and latch 1, reference number 28-1. Foreground/background multiplexers 32-1 through 32-M provide M bits to plane 1 of raster memory 12. Each of the M bits is one bit of a color word corresponds to a pixel. The other bits for a particular color word for a particular pixel are provided from a corresponding address in each of the other planes of the raster memory.

Four-to-one multiplexers 34-1 through 34-M provide the foreground input signal for input "1" of foreground-/background multiplexers 32-1 through 32-M, respectively. Four-to-one multiplexers 36-1 through 36M provide the background input signal for input "0" of foreground/background multiplexers 32-1 through 32-M, respectively.

FIGS. 3 and 4 show one possible combination of sources of inputs to the four-to-one multiplexers 34-1 through 34-M and 36-1 through 36-M in block 26-1. For four-to-one multiplexer 34, inputs 0 and 1 can come from the foreground portion of register 24, and inputs 2 and 3 can originate from bit one of the color data from memory plane 1, by way of latch 28-1. As shown more clearly in FIG. 4, inputs 2 and 3 of four-to-one multiplexer 34-1 through 34-M are supplied by bits 1 through M of the color data stored in latch 28-1.

Similarly, for four-to-one multiplexer 36, inputs 0 and 2 can originate from the background portion of register 24, while input 1 can originate from color data stored in memory plane 1. Also, input 3 can be the inverse of the color data stored in memory plane 1. More specifically, for four-to-one multiplexers 36-1 through 36-M, input one is supplied with, and input 3 is supplied with the inverse of, bits 1 through M of the color data stored in source latch 28-1.

It is to be understood that four-to-one multiplexers 34 and 36 can have sources of input different than those shown in FIGS. 3 and 4 to provide different effects. Table 1 below shows how the write mode control states select the signals that the four-to-one multiplexers 34 and 36 provide to multiplexers 32.

TABLE 1

| Write Mode | Multiplexer 36 | Multiplexer 34 |
|---|---|---|
| 0 0 | Background | Foreground |
| 0 1 | Source Latch | Foreground |
| 1 0 | Background | Source Latch |
| 1 1 | Source Latch | Source Latch |

In FIG. 3, multiplexer 34 is shown supplying the input signal to foreground/background multiplexer 32 which is provided as an output when the logic state of the bit from the CPU 16 is a logic one. Conversely, multiplexer 36 provides the input to foreground multiplexer 32 which is provided as an output when the logic state of the bit from the CPU is a logic zero.

Referring now to the decoloring block 30 of the present invention, such function is provided by an N-input AND gate fed by N comparators. This can be seen in FIG. 3, for example, with reference to N-input AND gate 38 and comparators 40. For the comparators 40 associated with latch 28-1, it can be seen that each comparator 40 receives a different bit from the background color information stored in foreground/background register 24. Further the same comparators receive an input from a corresponding bit from each of the latches 28-1 through 28-N. In this manner, a color word corresponding to a particular pixel is compared bit-by-bit with the background color information. A match will yield a particular logic state, in this example a logic one, at the output of N-input AND gate 38. In a similar manner a determination is made as to whether the remaining pixels, in the block of pixels which are addressed at any one time, match the background color information from foreground/background register 24. The outputs of AND gates 38 are each supplied as monochrome image data on the bus 23 by way of XOR gates 45-1 through 45-M. XOR gates 45-1 through 45-M supply an invert function under control of a mask polarity command.

It is to be understood that in accordance with the present invention, the color control information is treated by CPU 16 as I/0 commands. That is, there are no logical operations performed on such control information, and as such, the commands can be ignored by a monochrome system executing an application program written for a color monitor. Conversely, the present invention provides for default values for foreground and background colors such that monochrome applications programs can be executed without the need to further define color control information. In this manner upwards and downwards compatibility is achieved.

Returning to FIGS. 3 and 4, a read/write control register 44 is shown providing read enable signals to the N planes of raster memory 12, and also the write mode control signals. As discussed above, the CPU communicates with read/write control register 44 as an I/0 register. The read enable control is useful in designating which of the N planes of raster memory 12 will contribute to the monochrome bit data supplied to CPU 16 on a read operation.

Shown in FIG. 4 is a source latch protect register 46. This control register is treated as I/0 by CPU 16 and operates to provide a pixel-by-pixel write protect. That is, the source latch protect register 46 provides bit wise enable signals to each of the latches 28-1 through 28-N. When a particular bit is disabled, a pixel is in effect being protected from being written over by a subsequent pixel read operation.

EXAMPLE 1

OR

In a monochrome context, logically ORing data from raster memory with a desired pattern yields a high bit for any high bit of either the data from raster memory or the desired pattern. In the color context, and in accordance with the present invention, the analogous, but more complex task is to plot a dot of a desired color onto a background of unknown color. To do so, the user would set the foreground and background colors in foreground/background register 24 to the desired color. The write mode control would be selected to be "0 1". The appropriate address would be supplied to the raster memory 12 by CPU 16. The color data would be read out of raster memory 12 and stored into latches 28-1 through 28-N, and would then be compared against the background color stored in foreground-/background register 24. The result of the comparison would be a high bit to the CPU for each pixel having a color corresponding to the selected background color, and all other pixels having a low bit. The CPU 16 would then OR that information with the desired pattern and write the result back into raster memory using a foreground color corresponding to the selected color. For each high bit of the image data from CPU 16 the foreground color is written into raster memory 12. For each low bit of the image data, the corresponding pixel from the source latch is written into memory. See Table 1, supra.

EXAMPLE 2

AND

In monochrome graphics, the logical operation AND is often employed to place a bit pattern onto a reverse video field. In such cases, the object of interest is defined by low bits, and the field on which the object is placed is defined by high bits. In the color context, and assuming that it is desired to AND a green mask onto an unknown field of color, the background color in register 24 will be set to green, and the read/write control register 44 would provide a mask polarity bit which is high. The mask polarity bit is used in conjunction with the bits $B_1$ through $B_M$ which are supplied by decoloring means 30 to host 16 when color data is read from raster memory 12. The mask polarity bit is an invert command to decoloring means 30. That is, when the mask polarity bit is set, the bits supplied by decoloring means 30 to CPU 16 will be zero when the corresponding pixel color matches the color against which it is being compared, and the bit will be high when there is no match between the corresponding pixel color and the reference color. In FIG. 3 it can be seen that the mask polarity bit from read/write control register 44 is supplied to one input of XOR gates 45-1 through 45-M. Each of the XOR gates 45-1 through 45-M receives its other input from an associated AND gate 38. When the mask polarity bit is high, the XOR gates 45-1 through 45-M invert the signal from AND gates 38. When the mask polarity bit is low, no inversion will take place. Thus, in Example 1, since no inversion was desired, the mask polarity bit would have been set low.

The source latch protect register 46 will contain all low bits to indicate that no pixels are being protected against modification. Finally, the write mode control signal from register 44 will be set to "1 0". This means that in the write phase of the operation a low bit from the central processing unit will update the corresponding color value for the pixel in the raster memory with the background's color value held in register 24. A high bit will set the corresponding color data for the pixel to the value held in source latch 28 for that pixel location.

More specifically, the first phase of the operation reads the contents of raster memory 12 at the address indicated by the central processing unit 16. This read operation causes the contents at that location to be transferred to latches 28-1 through 28-N. This information is then compared in the comparators 38 with the background color stored in register 24; i.e., green. With the mask polarity bit set to a high level, the image data returned to the central processing unit 16 contains a low bit at the position of any green pixel and a high bit in the position of a pixel of any other color.

Within the central processing unit, an AND operation is performed with the data that was supplied by decoloring block 30 and the desired bit pattern than the normal monochrome style. The result of this operation is then written back into raster memory by way of coloring block 26. From Table 1 it can be seen that write mode "1 0" will cause the color green to be written into a pixel location when the bit supplied by central processing unit 16 is low, and will cause the original value for the pixel location to be written back into memory when the value of the bit supplied by the central processing unit is high. It can therefore be seen that with a single central processing unit instruction and updating of raster memory has been achieved.

EXAMPLE 3

XOR

In monochrome graphics, the logical operator XOR is often used to place and erase a dot or pattern in the visual image. This is a simple function in monochrome terms since the compliment of a pixel that is "on" is a pixel that is "off", and vice versa. Thus, turning a pixel on and off is a simple matter. In color graphics, however, the usefulness of an exclusive XOR operation is complicated by the fact that the compliment of one color is another color, but does not necessarily result in the turning of the color off, or in the obtaining of the background color. Further, instead of a single bit being complimented, a whole word must be complimented.

A graphics cursor is an example where a logical XOR operation can be useful. A cursor moves often and has to be removed from former positions as it does so. XORing a cursor image into memory changes the value of the color in a predictable fashion. XORing the mask again at the same memory location compliments the colors a second time, restoring them to their former values and making the cursor disappear. In accordance with the present invention, the color control information supplied by the CPU will be as follows: (1) designation of background or foreground colors is not required, (2) the mask polarity from color control register 44 will be set low, (3) "don't care" bits 1 through N will be set high so that the outputs of all latches 28-1 through 28-N do not effect the values of the image data bit supplied by AND gates 38, and (4) a write mode of "1 1" is chosen.

In the first phase of the XOR instruction execution, the contents of raster memory 12 will be read at the desired address. This operation transfer the data from each of the N planes of memory into corresponding latches 28-1 through 28-N. Because the "don't care" bits are all high, the image data being returned to the central processing unit 16 out of AND gates 38 will be all high. Also since the mask polarity bit is set low, there will be no inversion of the data being returned to the central processing unit 16.

It is to be noted that the "don't care" information is supplied to OR gates 27 which are positioned at the outputs of the comparators 40 so as to supply the inputs to N-input AND gates 38. It is also to be noted that there is a "don't care" bit for each of the N planes of raster memory 12. Thus, when a "don't care" bit is high the information from the corresponding comparator 40 is forced to an all high value. In this manner, by selecting the appropriate "don't care" bit, the information stored in a particular latch associated with a particular memory can be excluded from the comparison operation conducted by the comparators 40 and N-bit AND gates 38.

In the case of the setting of the "don't care" bits for the XOR operation, all "don't care" bits are set high and therefore the image data returned to the CPU 16 is all high.

Returning to the XOR operation, the all high bits received by the CPU 16 on bus 23 are XORed with the object of interest. The high bits in the object or image of interest will force a low value for that bit, while low bits in the object of interest will force the corresponding bit to be high.

The resulting image data is then written back into the raster memory 12 using the write mode "1 1". Recall that this mode causes the compliment of the color originally stored at the addressed location to be written back into the memory whenever an image data bit is low. When an image data bit is high, the original color is written back into the location.

Performing the same XOR operation again at the same location again compliments the color values of the pixel locations which in turn causes the pixel positions to return to their former values. In the above manner, by setting the appropriate color control information in the various color control registers, the CPU 16 is permitted to perform an XOR operation on monochrome type information while reading and writing information from and into raster memory 12 in the form of color data.

EXAMPLE 4

NOT

In monochrome graphics a NOT operator functions in a manner similar to the XOR operation, except that no object is used to modify the data. The NOT operation compliments all of the bits then writes the data back into memory. Such a function would be used in monochrome graphics to set a screen into reverse video or back again.

In the color graphics area, the NOT operator is useful with the color palette functional block 14 to compliment a color. To perform such an operation, the background and foreground colors need not be specified, the mask polarity bit can be set to zero, the "don't care" bits will be set to all high, and the write mode will be "1 1". In the read phase of the operation the contents of raster memory 12 will be read. The latches 28-1 through 28-N will be updated with the words from each of the memory planes, but the "don't care" bits will prevent the contents of the latches from affecting the comparison operations of comparators 40. The image data returned to CPU 16 will thus be all high. The CPU will then compliment these bits so that all low bits will be written back into raster memory 12. The write mode "1 1" will cause the compliment of the values stored in latches 28-1 through 28-N to be written back into the addressed location of raster memory 12.

For the preferred embodiment to the present invention, the coloring block 26 and decoloring block 30 are implemented by way of a programmable logic array device.

For the above examples it can be seen that by manipulating the information stored in the various registers different write and read operations can easily be obtained.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. An apparatus for converting monochrome data from a CPU into color data for display on a color monitor as a function of color control information which is specified by a user and supplied through the CPU comprising memory means addressed by the CPU for storing the color data, wherein the memory means includes N planes of memory each of which is addressed by the CPU; and means, responsive to the color control information and the monochrome data, and coupled to the CPU; and to the memory means, for converting the monochrome data into the color data as a function of the color control information and for converting the color data from the memory means into monochrome data for supply to the CPU, so that the CPU can perform logical operations upon monochrome data, independently of the color by which the data is to be displayed on the color monitor and further wherein the converting means include register means for storing the color control information;

N coloring means each of which is associated with one of the N planes of memory and each of which is responsive to the monochrome data and to the color control information for providing color data corresponding to the monochrome data to each of the associated planes of memory; and N-decoloring means responsive to the color information and to color data from memory means each of which is associated with one of the N planes of memory for collectively determining a corresponding monochrome value for the color data received from the memory means, and for providing the monochrome values to the CPU.

2. The apparatus of claim 1 wherein the CPU supplies an M-bit word of monochrome data for storage in the memory means, and further wherein the coloring means comprise M-selecting means coupled to the register means and each of which is controlled by a bit of the M-bit word of monochrome data for supplying color data from the color control information to an associated one of the N-planes of the memory means.

3. The apparatus of claim 2 wherein each of the N-planes of memory provide an M-bit word of color data and further wherein each of the N-decoloring means comprise latch means coupled to receive the M-bit word of color data from a corresponding one of the N-planes of the memory means for temporarily retaining the M-bit word of color data from the memory means; and comparison means coupled to the holding means and to receive an associated bit of the M-bit word stored in each of the latch means of the N-decoloring means for comparing the color control information in the register means to the associated bits from each of the latch means and for providing an indication representative of whether there is a match between said color control information in the holding means and the associated bits from each of the latch means.

4. The apparatus of claim 3 wherein each of the comparison means of the N-decoloring means comprise N-comparators, each receiving an associated bit from each of the latch means in each of the N-decoloring means, and color information from the register means, for comparing the associated bits from each of the N-decoloring means with the color information from the register means; and an N-input AND gate responsive to the output of the N-comparators, for providing an output which indicates whether the color information matches the associated bits from each of the N-decoloring means.

5. The apparatus of claim 4 wherein the color control information includes a mask polarity signal, further including means positioned at the output of each of the N-input AND gates of each of the N-decoloring means and responsive to the mask polarity signal for inverting the output of the N-input AND gates.

6. The apparatus of claim 5 wherein the inverting means comprise a plurality of exclusive-OR gates each of which receives the mask polarity signal, and each of which is coupled to the output of one of the N-input AND gates.

7. The apparatus of claim 4 wherein the color control information includes a "don't care" signal for each of the planes of memory, and further including means positioned in each of the N-decoloring means between each of the N-comparators and the inputs to the N-input AND gates and responsive to the "don't care" signal for overriding the output of the N-input AND gate associated with a plane of memory for which a "don't care" signal is asserted.

* * * * *